(12) United States Patent
Björk et al.

(10) Patent No.: US 7,128,020 B2
(45) Date of Patent: Oct. 31, 2006

(54) DEVICE AND A METHOD FOR ALLOWING PERFORMANCE OF SEVERAL SEPARATE TREATMENTS OF A TEAT OF AN ANIMAL

(75) Inventors: Anders Björk, Norsborg (SE); Gösta Forsén, Tullinge (SE); Bohao Liao, Sollentuna (SE)

(73) Assignee: Delaval Holding AB, Tumba (SE)

( * ) Notice: Subject to any disclaimer, the term of this patent is extended or adjusted under 35 U.S.C. 154(b) by 0 days.

(21) Appl. No.: 10/491,233

(22) PCT Filed: Oct. 10, 2002

(86) PCT No.: PCT/SE02/01853

§ 371 (c)(1),
(2), (4) Date: Mar. 29, 2004

(87) PCT Pub. No.: WO03/030630

PCT Pub. Date: Apr. 17, 2003

(65) Prior Publication Data

US 2004/0231603 A1    Nov. 25, 2004

(30) Foreign Application Priority Data

Oct. 10, 2001    (SE)    .................................... 0103367

(51) Int. Cl.
*A01J 7/04*    (2006.01)
(52) U.S. Cl. .................. 119/14.18; 119/670; 119/14.02
(58) Field of Classification Search ............ 119/14.01, 119/14.04, 14.08, 14.47, 670, 14.18
See application file for complete search history.

(56) References Cited

U.S. PATENT DOCUMENTS

| | | | | |
|---|---|---|---|---|
| 3,713,423 A | * | 1/1973 | Sparr, Sr. .................... 119/670 |
| 4,452,268 A | * | 6/1984 | Icking et al. ................ 137/240 |
| 5,762,020 A | * | 6/1998 | van der Lely ........... 119/14.08 |
| 6,105,536 A | * | 8/2000 | DeWaard .................. 119/14.04 |
| 6,234,110 B1 | * | 5/2001 | Xavier ...................... 119/14.47 |
| 6,279,507 B1 | * | 8/2001 | van der Lely et al. .... 119/14.01 |
| 6,343,566 B1 | * | 2/2002 | Eriksson ................... 119/14.01 |
| 6,394,029 B1 | * | 5/2002 | Bowers .................... 119/14.18 |
| 6,443,094 B1 | * | 9/2002 | DeWaard .................. 119/14.18 |
| 6,553,942 B1 | * | 4/2003 | Eriksson ...................... 119/670 |
| 6,591,784 B1 | * | 7/2003 | Eriksson ...................... 119/670 |

FOREIGN PATENT DOCUMENTS

| | | |
|---|---|---|
| DE | 24 44 055 | 9/1974 |
| EP | 0 945 057 A1 | 9/1999 |

(Continued)

*Primary Examiner*—Michael J. Carone
*Assistant Examiner*—Bret Hayes
(74) *Attorney, Agent, or Firm*—Hovey Williams LLP (57) ABSTRACT

This invention relates to a device and a method for allowing performance of several separate treatment of a teat of an animal. The device includes a cup-shaped body (1) having a surface (2) defining an inner space (3), which is arranged to receive the teat of the animal. The device also includes a first delivery mechanism arranged to provide a first treatment by supplying a first medium (4) to the teat via at least a first passage having a plurality of openings (10, 18) to the inner space (3) and at least one additional delivery mechanism arranged to provide an additional medium (13, 26, 28) to the teat, via at least an additional passage having a plurality of openings (10,18) to the inner space(3). Thereby, the device provides at least two different treatments of the teats at different occasions.

23 Claims, 4 Drawing Sheets

FOREIGN PATENT DOCUMENTS

| | | |
|---|---|---|
| FR | 2559351 | 8/1985 |
| WO | WO 89/ 00378 | 1/1989 |
| WO | WO 99/03331 | 1/1999 |
| WO | WO 99/27775 | 6/1999 |
| WO | WO 99/38374 | 8/1999 |
| WO | WO 01/17337 A1 | 3/2001 |

* cited by examiner

DEVICE AND A METHOD FOR ALLOWING PERFORMANCE OF SEVERAL SEPARATE TREATMENTS OF A TEAT OF AN ANIMAL

THE BACKGROUND OF THE INVENTION AND PRIOR ART

The present invention relates to a device and a method for allowing performance of several separate treatments of a teat of an animal, wherein the device comprises a cup-shaped body having a surface defining an inner space, which is arranged to receive a teat of the animal and first means arranged to provide a first treatment by supplying a first medium to the teat via at least a first passage having a plurality of openings to the inner space.

It is usual to treat the teats of an animal after a milking process with a mixture comprising an antiseptic medium and a softener, which may be a skin conditioner. The object of the antiseptic means is to prevent bacteria and other microorganisms from infecting the udder quarter after the milking process is finished. This treatment may be performed by means of a so-called dip-cup. The dip-cup is an open container, filled with a liquid medium comprising an antiseptic means and a softener. Each of the teats of an animal is dipped into the disinfecting medium after the milking process is finished. The dip-cup has to be kept steadily in an upright position during the whole treatment in order to prevent the disinfecting medium in the dip-cup from splash over.

EP 0 945 057 shows a device for supplying a cleaning and/or disinfecting liquid to the teat of an animal by spraying. Spraying elements are provided at an upper part of a teat cup. The liquid is sprayed to the teat, when the teatcup being in a position below the teat. In such a manner, the cleaning and/or disinfecting liquid will be concentrated to the lower part of the teat and the area around the outlet of the teat canal. However, in some cases, it is desired to distribute a treatment medium to the whole surface of the teat, for example, when the medium comprises a softener. Furthermore, it is difficult to spray a treatment medium in a desired direction with a high precision and supply an exactly desired quantity of the medium to the surface of the teat.

WO 01/17337 shows a device comprising a teat-cleaning cup, having an inner space arranged to receive a teat of an animal. The walls of the teat cleaning cup comprises channels having a plurality of orifices provided in a surface, defining the inner space. During a cleaning treatment of a teat, a cleaning liquid is supplied through the channels and is distributed, via the orifices, to substantially the whole surface of the teat. Consequently, such a device provides an effective cleaning of the teat before a milking process.

WO 99/27775 shows a teat cleaning device arranged to perform a cleaning treatment of a teat of an animal in combination with a pre-milking process. The teat cleaning device comprises, in one embodiment, a cylindrical teat cup for receiving the teat and cleaning means in the form of a hose ending in an inlet nozzle through which a cleaning liquid is arranged to be sprayed to the teat. Furthermore, there is mentioned in the application that a sterilising fluid also may be supplied to the teats by the cleaning device before or after the supply of the cleaning liquid. However, the cleaning liquid and sterilising fluid constitutes two different cleaning mediums, which are supplied during the same cleaning treatment of the teat before a milking process of the animal is started.

SUMMARY OF THE INVENTION

The object of the present invention is to provide a device, which may be used to provide at least two different treatments of the teats of an animal, especially in connection with a milking process of the animal, wherein at least two different treatment mediums are allowed to be separately supplied at different occasions to the respective teats.

This object is achieved in that the device comprises at least one additional means arranged to provide an additional treatment by supplying an additional medium to the teat via at least an additional passage having a plurality of openings to the inner space. By said first and additional passages, the device allows a distribution of at least two different mediums, via the cup-shaped body, to the teat and makes at least two different treatments; of the teats possible. Since the cup-shaped body has an inner space for receiving substantially the whole teat, a supply of the mediums to substantially the whole surface of the teat is possible, by using a great number of openings provided in suitable positions in the surface. Thereby, it is possible to supply a substantially exact quantity of the medium to a desired position of the teat. Consequently, such a device provides at least two different treatments of a high quality of the teats.

According to a preferred embodiment of the invention, the first medium and the additional medium are supplied to the inner space via the same openings. Thereby, the first and the additional passages have at least a common end portion and the same outlet openings to the inner space. In some cases, it is possible to use the common passages for different mediums. Such a use requires an effective removal of the remaining first medium in the passages before the additional medium will be supplied. Alternatively, the first medium and the additional medium are supplied to the inner space via different openings. In this case, the different mediums are supplied through different passages to the teat. Hereby, the number of openings and its positions will be adapted especially to the specific treatment.

According to a further embodiment of the invention, said first and additional passages comprises a portion extending in the cup-shaped body, which portion comprises a main channel and at least two sub-channels extending between the main channel and a respective opening to the inner space. By using such passages in the cup-shaped body, a supply of the first and the additional mediums to a great number of openings are allowed. Preferably, the first and the additional mediums are supplied to the inner space in a substantially tangential direction in relation to the surface defining the inner space. Thereby, the supplied mediums obtain a flow direction substantially along the surface of the inner space. The medium obtains a rotation around the teat, which results in a favourable distribution of the mediums along the surface of the teat.

According to a further embodiment of the invention, one of said separate treatments may be a cleaning treatment. The cup-shaped body has a construction, which makes it suitable to provide an effective cleaning of the whole teat. Such a cleaning treatment may be supplied to the teat at desired occasions. The cleaning medium may comprise water, a soap solution, a sterilising liquid, or combinations of these. At an automatic milking process performed by a milking robot, the robot may bring the cup-shaped body to the respective teats for cleaning the teats before or after the milking process.

According to a further embodiment of the invention, one separate treatment may be an antiseptic treatment of the teat and an antiseptic medium may be supplied to the teat. The cup-shaped body has a construction, which also makes it suitable to provide an effective separate antiseptic treatment of teats. Such an antiseptic treatment may be performed at desired occasions. Another example of a separate treatment may comprise a supply of a softener to the teat. Such a softener, as a skin conditioner, is suitable to supply in order to keep the teats in a good condition. The antiseptic medium and/or the softener may be supplied to the teat after a milking process. In such a case, the milking robot could be used to supply the cup-shaped body to the respective teats after the milking process in order to provide a separate treatment, where a mixture of an antiseptic medium and a softener are supplied to the teats. The antiseptic medium and the softener are here arranged to be provided in a layer on the skin of the teat. Thereby, the antiseptic medium prevents the teat from being affected by bacterium and the softener prevents the skin of the teat from being chapped. Alternatively, the antiseptic medium and the softener may be supplied as separate treatments at different occasions. Other separate treatments, which may be performed at desired occasions, may comprise a supply of mediums comprising iodine, a sun lotion or glycerol etc. It is to be noted that the treatment does not need to take place in a milk box. Other locations may be a feeding box, a special treatment box, or another separate box.

According to a further embodiment of the invention, said first means comprises a first source comprising the first medium and a first supplying device to allow a transportation of the first medium to the inner space. In a corresponding way, said additional means may comprise an additional source comprising the additional medium and an additional supplying device to allow a transportation of the additional medium to the inner space. By such supplying devices, a separate supply of the respective mediums to the inner space will be provided at desired occasions.

According to a further embodiment of the invention, said first supplying device and the additional supplying device comprise at least one valve member arranged to allow a separate supply of any one of the first medium and the additional medium to the inner space. By using suitable valve members, it is easy to obtain a separate supply of the respective medium to the inner space at the different treatments. Such a valve member may comprise a two-way valve or a three-way valve. A control unit may control the valve member. Advantageously, the control unit is a computer comprising suitable software for providing such a control. At least one of the first supplying device and the additional supplying device may comprise a container arranged to store the respective medium at an overpressure, in order to allow a transportation of the medium to the inner space. By using pressured containers for storing the mediums, the respective mediums may be transported by the overpressure to the inner space, when a valve member is in an open position. Alternatively, at least one of the first supplying device and the additional supplying device comprises a pump member arranged to allow a transportation of the medium to the inner space. Hereby, the control unit may activate the pump member, when a transportation of one of the mediums to the teat is desired.

According to a further embodiment of the invention, the cup-shaped body may comprise an outlet conduit to allow removal of the remaining medium from said first and additional treatments. Such an outlet conduit is preferably provided at a lower portion of the cup-shaped body and the remained medium flows downwards by the gravity to, for example, a collecting container. Preferably, the outlet conduit of the cup-shaped body is connected to a vacuum source. Such a vacuum source provides a favourable motion of the medium along the inner space of the cup-shaped body and provides an effective evacuation of the remained medium through the outlet conduit.

The invention comprises also a method for allowing performance of several separate treatments of a teat of an animal by means of a cup-shaped body having a surface defining an inner space, which is arranged to receive a teat of the animal, wherein the method comprises the step of providing a first treatment of the teat by supplying a first medium to the teat via at least a first passage having at least one opening to the inner space. The method is characterised in the further step of providing an additional treatment of the teat by supplying an additional medium to the teat via at least an additional passage having a plurality of openings to the inner space. The first treatment may be a cleaning treatment of the teats, which is provided before a milking process is started, and the additional treatment may be an antiseptic treatment of the teats, which is provided after the milking process is ended.

BRIEF DESCRIPTION OF THE DRAWINGS

The present invention is now to be explained more closely by means of preferred embodiments, which are disclosed as examples, and with reference to the attached drawings.

DETAILED DESCRIPTION OF PREFERRED EMBODIMENTS OF THE INVENTION

Figure 1:
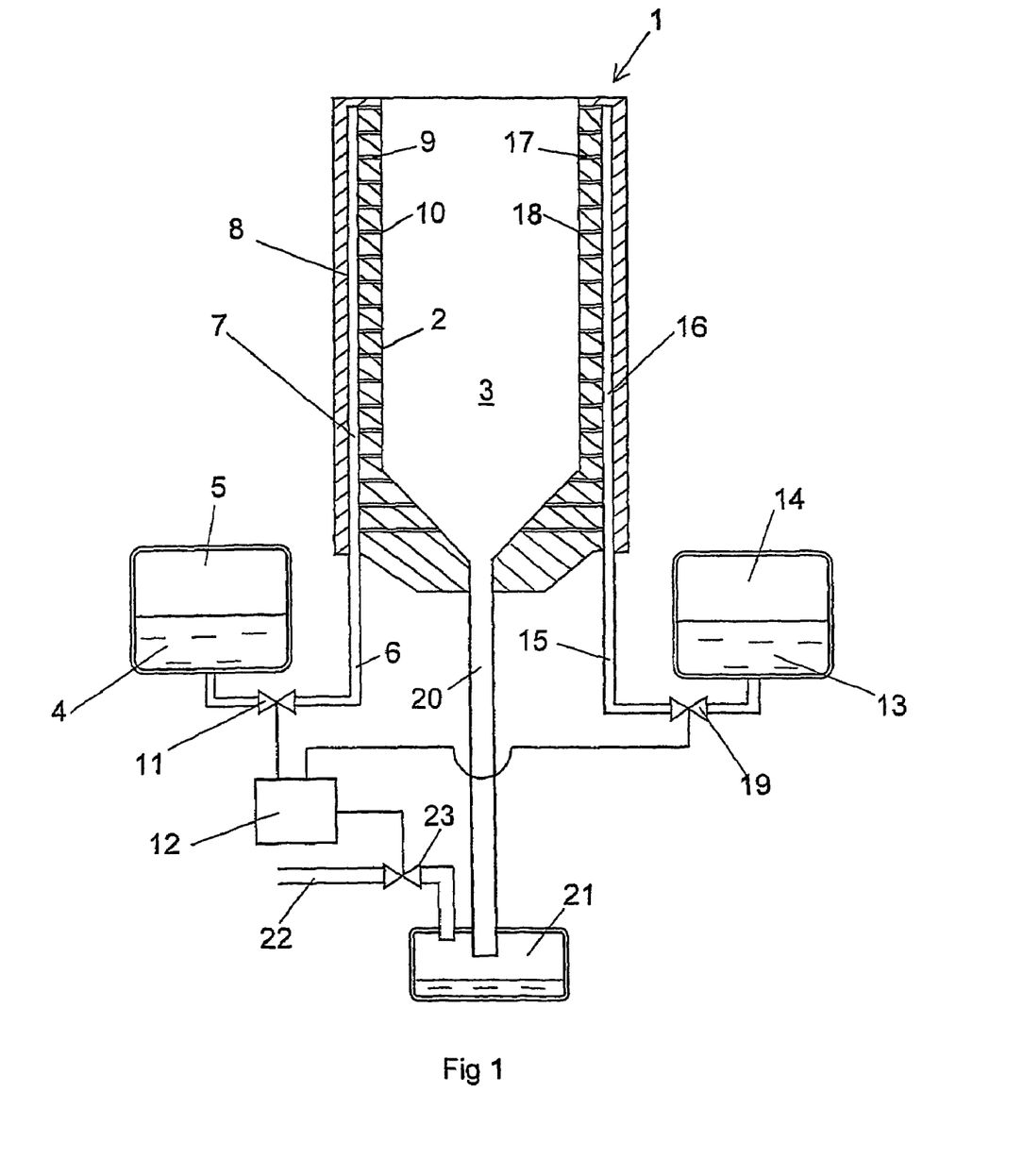
FIG. 1 shows a first embodiment of a device according to the invention.

FIG. 1 shows a cup-shaped body 1. The cup-shaped body 1 has an inner surface 2 defining an inner space 3. The inner space 3 is arranged to receive a teat of an animal, in this case, during two different treatments of the teat. A first treatment medium in form of a cleaning medium 4 is stored in a first container 5 at an overpressure. The cleaning medium may be water or a soap solution. A first passage extends between the first container 5 and the inner space 3 of the cup-shaped body 1. The first passage comprises a first conduct 6 extending between the first container 5 and an inlet to the cup-shaped body 1. In the cup-shaped body 1, the first passage comprises a main channel 7, which extends in an axial direction through substantially a whole length of the wall 8 of the cup-shaped body 1. A plurality of sub-channels 9 extend with substantially equal intervals in a radial direction between the main channel 7 and openings 10 in the inner surface 2. A first two-way valve 11 is provided in the first conduit 6. A control unit 12 is arranged to control the position of the first two-way valve 11 in order to control the flow of the first cleaning medium 4 to the inner space 3 during a cleaning treatment of the teat.

A second treatment medium 13 comprising a mixture of an antiseptic means and a softener is stored in a second container 14 at an overpressure. A second passage extends between the second container 14 and the inner space 3 of the cup-shaped body 1. The second passage comprises a second conduit 15, which extends between the first container 5 and an inlet to the cup-shaped body 1. In the cup-shaped body 1, the second passage comprises a second main channel 16, which extends in an axial direction through substantially the whole length of the wall 8 of the cup-shaped body 1. A plurality of second sub-channels 17 extend with substantially equal intervals in a radial direction between the second main channel 16 and corresponding second openings 18 provided in the inner surface 2. A second two-way valve 19 is provided in the second conduit 15. The control unit 11 also controls the position of the second two-way valve 19. Thereby, the control unit 12 controls the flow of the second medium 13 to the inner space 3 of the cup-shaped body 1.

The cup-shaped body 1 comprises, at a lower part, an outlet conduit 20 to allow removal of the respective medium from the treatment processes. The outlet conduit 20 ends in a collecting container 21 arranged to collect the remaining medium. The collecting container 21 is connected to a vacuum source by a vacuum conduit 22. The control unit 12 is arranged to control the supply of the vacuum by means of a third two-way valve 23 provided in the vacuum conduit 22. The remaining medium in the inner space 3 of the cup-shaped body 1 and possibly extracted pre-milk flows downwards through the outlet conduit 20 to the collecting container 21 by means of the vacuum source and the gravity.

Before a milking process of an animal is started, a cleaning treatment of the teats is required. A milking robot takes the cup-shaped body 1 and places it below an udder of an animal. Thereafter, the milking robot raises the cup-shaped body 1 such that a first teat of the udder enters the inner space 3 of the cup-shaped body 1. The control unit 12 switches the third two-way valve 23 to an open position and vacuum supplies to the inner space 3 via the conduit 22. Thereby, the teat obtains a correct position in the space 3 of the cup-shaped body 1. The control unit 12 switches the first two-way valve 11 to an open position. The cleaning medium 4, which is stored at an overpressure in the container 5, flows, via the first conduit 6, the first main channel 7, the sub channels 9 and the openings 10, to the inner space 3 and the teat of the animal. The vacuum in the inner space 3 provides a favourable motion of the cleaning medium 4 between the inner surface 2 of the cup-shaped body 1 and the teat. The vacuum also provides an effective evacuation of the used cleaning medium 4, via the outlet conduit 20, to the collecting container 21. When the cleaning treatment is finished, the control unit 12 closes the first two-way valve 11 and then the third two-way valve 23. The milking robot removes the cup-shaped body 1 from the teat and supplies the cup-shaped body 1 to another teat of the udder. After all teats of the animal have been subjected to a cleaning treatment, the milking robot starts the milking process.

When the milking process has finished, an antiseptic treatment of the teats usually is required. The milking robot again brings the cup-shaped body 1 to a position below the udder and raises the cup-shaped body 1 such that a first teat of the udder enters the inner space 3 of the cup-shaped body 1. The control unit 12 switches the third two-way valve 23 to an open position and vacuum supplies via the conduit 22 to the inner space 3 of the cup-shaped body 1. The teat obtains a correct position in the cup-shaped body 1 and the control unit 12 switches the second two-way valve 19 to an open position. The second medium 13, which comprises a mixture of an antiseptic means and a softener, is stored at an overpressure in the container 14. When the second two-way valve 19 is open, the second medium 13 flows, via the second conduit 15, the second main channel 16, the sub channels 17 and the openings 18, to the inner space 3 and the teat of the animal. The vacuum in the inner space 3 provides a favourable motion of the medium 13 between the inner surface 2 of the cup-shaped body 1 and the teat. The vacuum also provides an effective evacuation of the remaining second medium 13 after use, via the outlet conduit 20, to the collecting container 21. When the treatment is finished, the control unit 12 switches the second two-way valve 19 to a closed position and disconnects the flow of the second medium 13 to the teat. Thereafter, the control unit 12 switches the third two-way valve 23 to a closed position and disconnects the vacuum acting on the inner space 3. The milking robot removes the cup-shaped body 1 from the teat and brings the cup-shaped body 1 to a position allowing a treatment of the remaining teats of the udder. In this embodiment, the first medium 4 and the second medium 13 is supplied through entirely separate passages to the inner space 3 of the cup-shaped body 1.

Figure 2:
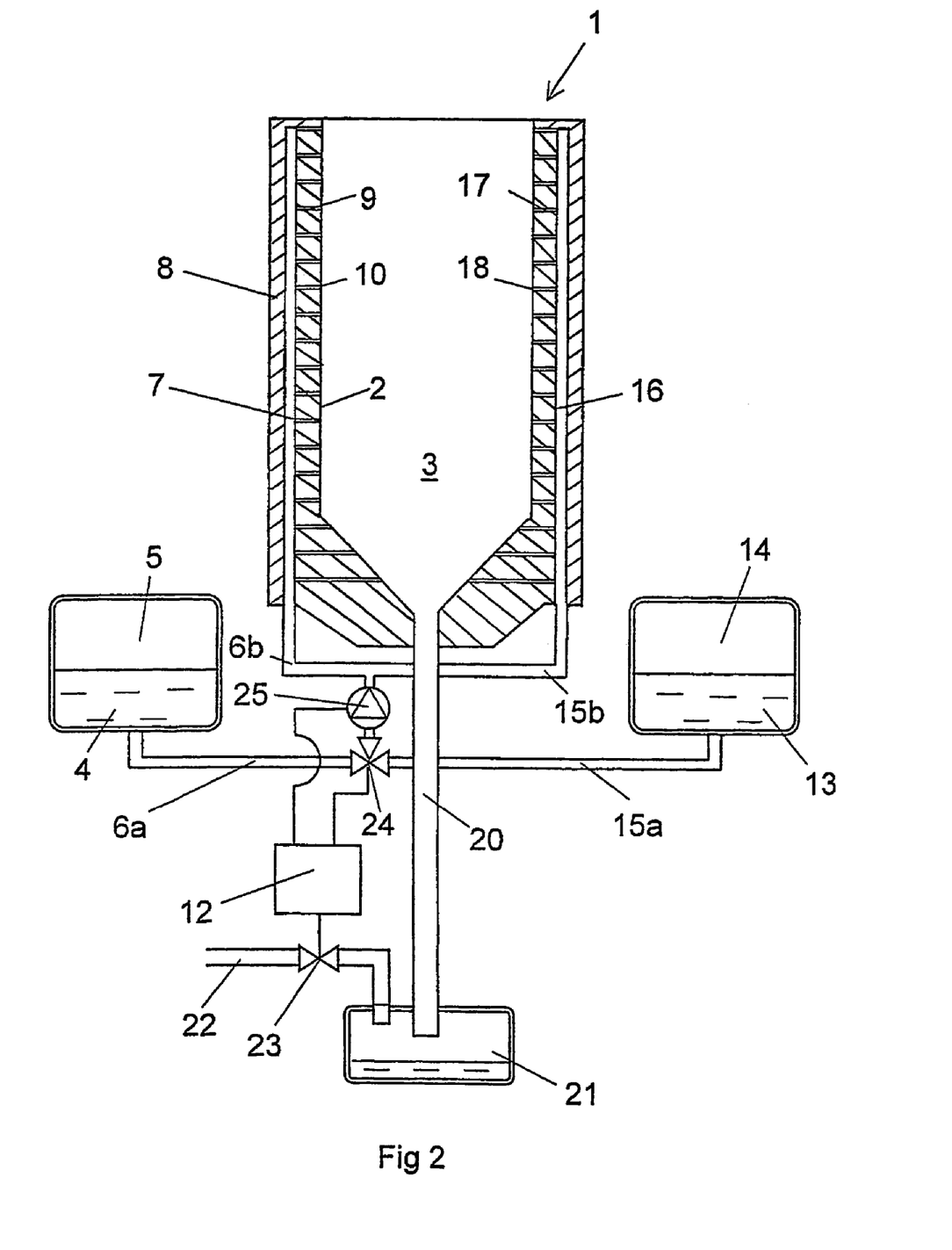
FIG. 2 shows a second embodiment of a device according to the invention.

FIG. 2 shows an alternative embodiment of the invention. In this embodiment, the first medium 4 and the second medium 13 are supplied, via the same openings 10, 18 in the cup-shaped body 1, to the teat of the animal. A three-way valve 24 is provided in a connection point between a first conduit 6a connected to the first container 5 and a second conduit 15a connected to the second container 14. The three-way valve 24 is controlled by the control unit 12. In this case, the mediums 4, 13 are not stored at an overpressure in the containers 5, 14. A pump 25 is provided upstream of the three-way valve 24 in order to allow transportation of the respective medium 4, 13 to the teat. The control unit 12 also controls the activation of the pump 25.

In order to provide a first treatment or a second treatment of a teat, the milking robot brings the cup-shaped body 1 to a position such the inner space 3 of the cup-shaped body 1 receives the teat. Thereafter, the control unit 12 opens the third two-way valve 23 and vacuum is supplied to the teat located in the inner space 3 of the cup-shaped body 1. The control unit 12 switches the three-way valve 24 to a position where one of the mediums 4, 13 allows to pass through the three-way valve 24. At the same moment, the control unit 12 activates the pump 25 for transportation of the medium 4, 13 to the teat. The medium 4, 13 is transported, upstream the pump 25, through both the first and the second main channels 7, 16, via the first and the second sub channels 9, 17 and the first and the second openings 10, 18 to the teat. The vacuum provides an effective evacuation of the remaining medium 4, 13 in the passage and in the inner space 3 of the cup-shaped body 1 after use. Thereby, it is possible to use the same passages and opening 10, 18 for the both treatment mediums 4, 13.

Figure 3:
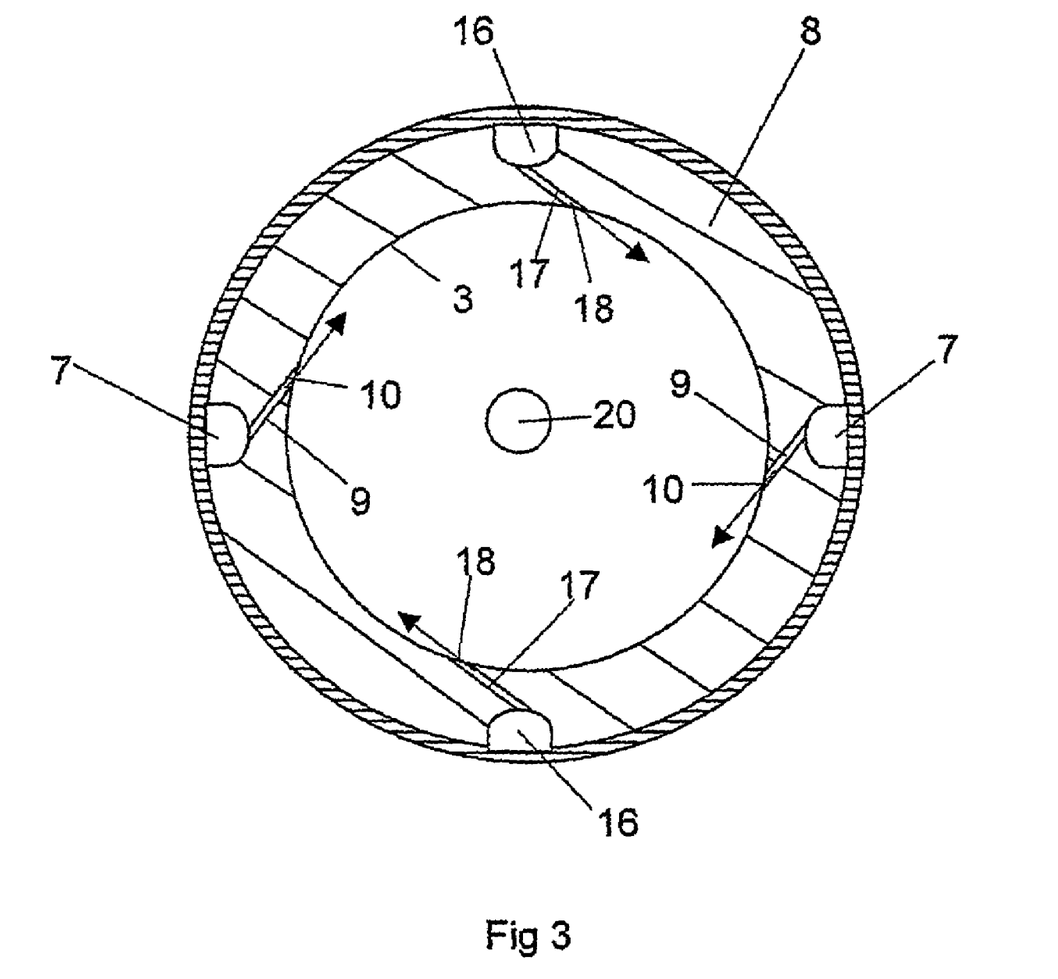
FIG. 3 shows a cross section view from the above of a cup-shaped body according to a third embodiment and FIG. 4 shows a fourth embodiment of a device according to the invention.

FIG. 3 shows a cross section view of a cup-shaped body 1, according to a third alternative embodiment. In this case, the cup-shaped body 1 comprises two main channels 7 for supplying a first medium 4 and two main channels 16 for supplying a second medium 13 to a teat. The corresponding main channels 7, 16 are provided at opposite sides of the wall 8 of the cup-shaped body 1. Thereby, a further favourable distribution of the mediums 4, 13 are provided to the surface of the teat. The sub channels 9, 17, which extend between the main channels 7, 16 and the openings 10, 18, have an inclination in relation to the inner surface 3. The inclination of the sub channels 9, 17 results in that the mediums 4, 13 are supplied in a substantially tangential direction in relation to the inner surface 3 of the cup-shaped body 1. Such flow directions of the mediums 4, 13 provide a favourable rotation of the medium between the teat and the inner surface 2 of the cup-shaped body 1.

Figure 4:
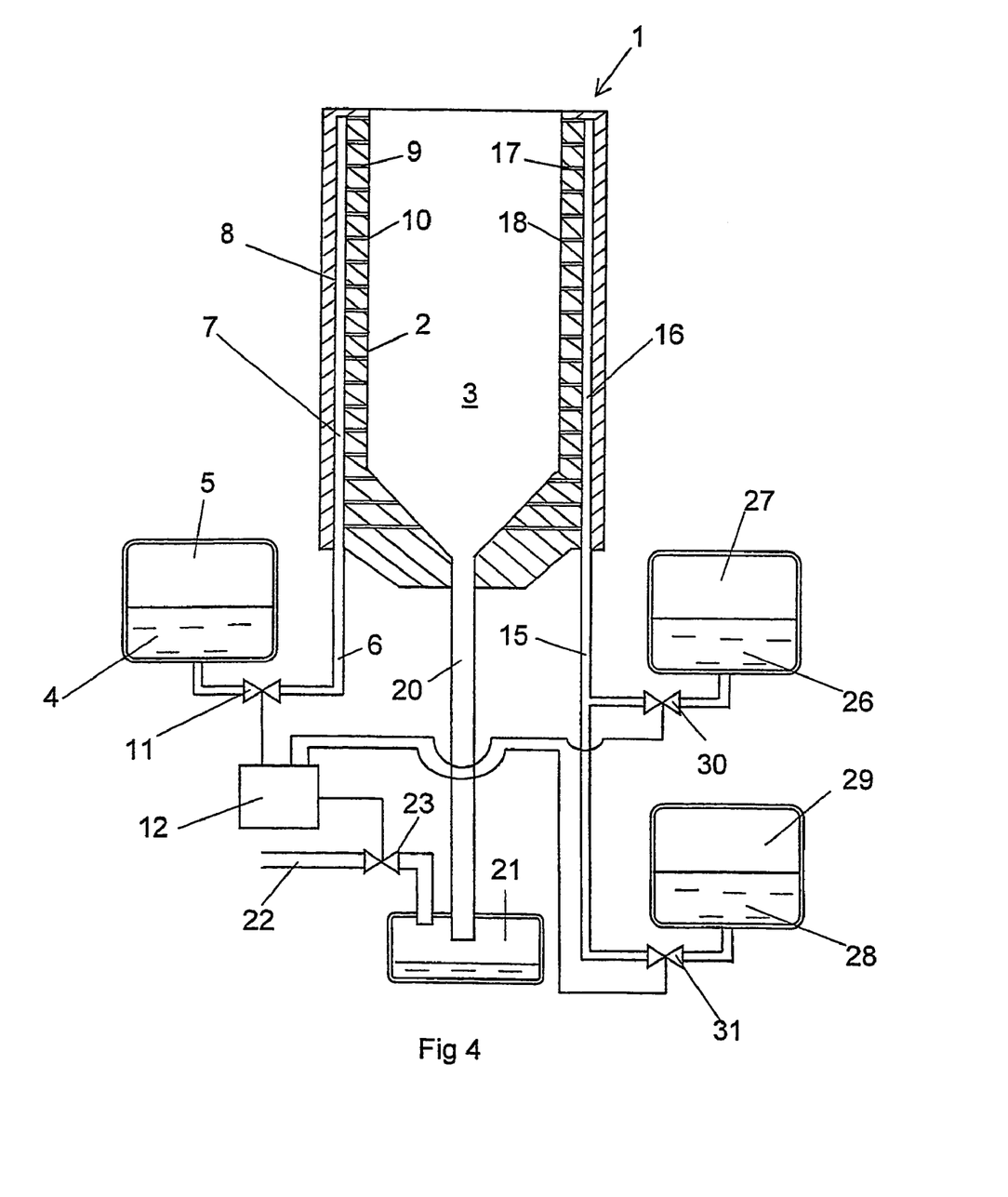

FIG. 4 shows a further alternative embodiment of the invention. In this case, the device allows performing of three separate treatments and the supply of three different treatment mediums. A first treatment medium in form of a cleaning medium 4 is stored in a first container 5 at an overpressure. A first passage extends between the first container 5 and the inner space 3 of the cup-shaped body 1. A second treatment medium in form of an antiseptic medium 26 is stored in a second container 27 at an overpressure. A second passage extends between the second container 27 and the inner space 3 of the cup-shaped body 1. A third treatment medium in form of a softener 28 is stored in a third container 29 at an overpressure. A third passage extends between the third container 29 and the inner space 3 of the cup-shaped body 1. Consequently, the cleaning medium 4 is supplied through a separate passage, in relation to the antiseptic medium 26 and the softener 28, to the inner space 3 of the cup-shaped body 1. The antiseptic medium 26 and the softener 28 are supplied through-substantially the same passage to the inner space 3 of the cup-shaped body. The supply of the respective medium 4, 26, 28 to the inner space 3 of the cup-shaped body 1 is controlled by a respective two-way valve 11, 30, 31 controlled by the control unit 12. In this case, it is possible to perform three different treatments comprising a separate antiseptic treatment and a separate supply of a softener to the teat.

The invention is not restricted to the described embodiments disclosed in the figures, but may be varied freely within the scope of the claims. The respective mediums may be provided to the inner space of the cup-shaped body 1 via an arbitrary number of arbitrary shaped passages and openings. Such passages need not necessary have a main channel and sub channels in the cup-shaped body as disclosed in the figures. The device may have a construction allowing the performance of an arbitrary number of separate treatments, which may be performed at desired occasions. The at least two possible treatments of the device, may be of an arbitrary kind. Except the treatments described above, the device may provide treatments supplying iodine, sun lotion and glycerol etc.

The invention claimed is:

1. A device for allowing performance of several separate treatments of a teat of an animal, which treatments comprise supplying a medium to the teat from a media group consisting of a cleaning medium, an antiseptic medium, a medium comprising a softener, a medium comprising an antiseptic medium and a softener, a medium comprising iodine, a medium comprising sun lotion, and a medium comprising glycerol, the device comprising;
   a cup-shaped body having a surface defining an inner space, which is arranged to receive a teat of the animal;
   a first source for a first medium comprising one medium of the media group and a first supplying device to allow transportation of the first medium from the first source to the inner space of the cup-shaped body, said first supplying device including at least a first passage fluidically connected to a plurality of openings fluidically communicating with the inner space for allowing performance of a first treatment of the teat by the first medium; and
   at least one additional source for an additional medium comprising an additional medium of the media group and different from said first medium and an additional supplying device to allow transportation of the additional medium to the inner space of the cup-shaped body, said additional supplying device including at least an additional passage fluidically connected to a plurality of openings fluidically communicating with the inner space for allowing performance of an additional treatment of the teat by the additional medium.

2. A device according to claim 1, wherein the first medium and the additional medium are supplied to the inner space via the same openings.

3. A device according to claim 1, wherein the first medium and the additional medium are supplied to the inner space via different openings.

4. A device according to claim 1, wherein said first and additional passages comprise a portion extending in the cup-shaped body, which portion comprises a main channel and at least two sub-channels extending between the main channel and a respective opening to the inner space.

5. A device according to claim 1, wherein at least one of the first medium and the additional medium is supplied in a substantially tangential direction in relation to the surface defining the inner space.

6. A device according to claim 1, wherein one of said first medium and said additional medium is a cleaning medium.

7. A device according to claim 6, wherein the cleaning medium is arranged to be supplied to the teat before a milking process.

8. A device according to claim 1, wherein one of said first medium and said additional medium comprises an antiseptic medium.

9. A device according to claim 8 wherein the antiseptic medium is arranged to be supplied to the teat after a milking process.

10. A device according to claim 1, wherein one of said first medium and said additional medium comprises a softener.

11. A device according to claim 10, wherein the medium comprising a softener is arranged to be supplied to the teat after a milking process.

12. A device according to claim 1, wherein at least one of the first source and the additional source comprises a container for storing the respective media.

13. A device according to claim 1, wherein the first supplying device and the additional supplying device comprise at least one valve member arranged to allow a separate supply of any one of the first medium and the additional medium to the inner space.

14. A device according to claim 1, wherein at least one of the first supplying device and the additional supplying device comprises a container arranged to store the respective medium at an overpressure, in order to allow a transportation of the medium to the inner space.

15. A device according to claim 1, wherein at least one of the first supplying device and the additional supplying device comprises a pump member, arranged to allow a transportation of the respective medium to the inner space.

16. A device according to claim 1, wherein the cup-shaped body comprises an outlet conduit to allow removal of remaining medium from said first and additional treatments.

17. A device according to claim 16, wherein the outlet conduit of the cup-shaped body is connected to a vacuum source.

18. A method for allowing performance of several separate treatments of a teat of an animal by supplying a first medium and another medium to a cup-shaped body having a surface defining an inner space, which is arranged to receive a teat of the animal, wherein the method comprises the steps of:
   providing a first treatment of the teat by supplying a first medium selected from a media group consisting of a cleaning medium, an antiseptic medium, a medium comprising a softener, a medium comprising an antiseptic medium and a softener, a medium comprising iodine, a medium comprising sun lotion, and a medium comprising glycerol to the teat via at least a first passage fluidically connected to a plurality of openings fluidically communicating with the inner space; and providing an additional treatment of the teat by supplying an additional medium selected from the media group and different from said first medium to the teat via at least an additional passage fluidically connected to a plurality of openings fluidically communicating with the inner space.

19. A method according to claim 18, wherein said first treatment is a pretreatment including cleaning of the teat before a milking operation and that said additional treatment is a posttreatment after a milking operation.

20. A method according to claim 19, wherein said posttreatment includes supplying an antiseptic medium to the teat.

21. A method according to claim 20, wherein said posttreatment includes supplying a medium comprising a softener to the teat.

22. A method according to claim 19, wherein said posttreatment includes supplying a medium comprising a softener to the teat.

23. A device for allowing performance of several separate treatments of a teat of an animal, the device comprising;

a cup-shaped body having a surface defining an inner space, which is arranged to receive a teat of the animal;

a first delivery mechanism arranged to provide a first treatment by supplying a first medium selected from a media group consisting of a cleaning medium, an antiseptic medium, a medium comprising a softener, a medium comprising an antiseptic medium, a medium comprising an antiseptic medium and a softener, a medium comprising iodine, a medium comprising sun lotion, and a medium comprising glycerol to the teat, said first delivery mechanism including at least a first passage fluidically connected to a plurality of openings fluidically coupled with the inner space; and at least one additional delivery mechanism arranged to provide an additional treatment by supplying an additional medium selected from the media group and different from said first medium to the teat, said additional delivery mechanism including at least an additional passage fluidically connected to a plurality of openings fluidically coupled the inner space.

\* \* \* \* \*